W. S. BELLOWS.
VALVE.
APPLICATION FILED SEPT. 14, 1909.
995,110.
Patented June 13, 1911.
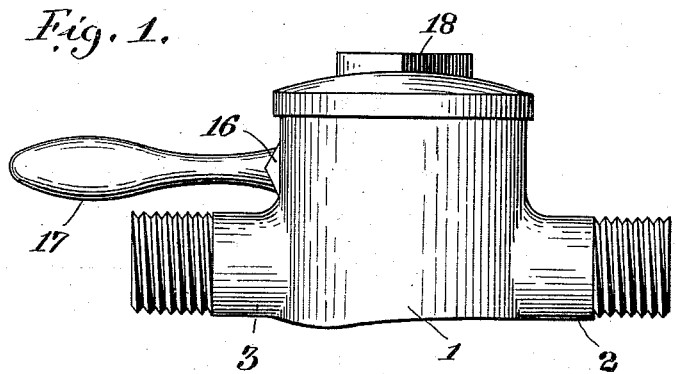
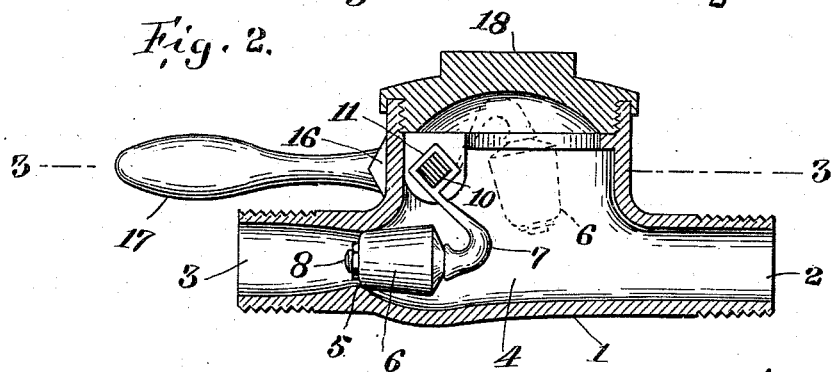
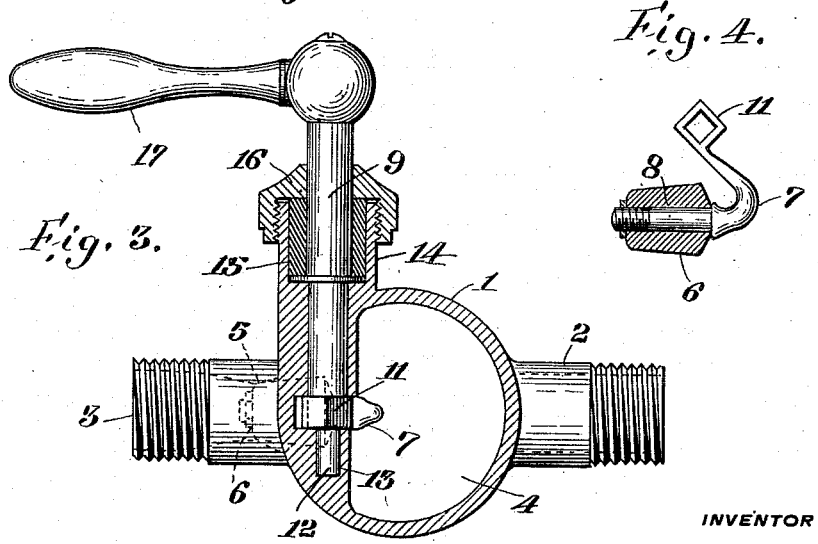
WITNESSES
INVENTOR
Winfield S. Bellows
BY
ATTORNEY

UNITED STATES PATENT OFFICE.

WINFIELD S. BELLOWS, OF STEELTON, PENNSYLVANIA.

VALVE.

995,110.

Specification of Letters Patent.   Patented June 13, 1911.

Application filed September 14, 1909.   Serial No. 517,577.

*To all whom it may concern:*

Be it known that I, WINFIELD S. BELLOWS, a citizen of the United States, residing at Steelton, in the county of Dauphin and State of Pennsylvania, have invented certain new and useful Improvements in Valves, of which the following is a specification.

My invention relates to valve structures, and the object of my invention is to provide an improved form of structure having a casing with a through opening, preferably at the bottom of the same; to provide a valve for controlling the outlet passageway of said through opening, with means for operating said valve so that it may be raised clear of the line of the through opening, the casing having a chamber into which the valve may be raised. By preference the valve is carried by a bent arm, which greatly facilitates the seating and positioning of the same, such valve seating at a point beyond the pivotal connection of its operating arm. The arm may be carried by a shaft or spindle journaled within the casing, with an external operating handle connected to said shaft or spindle. These and other features of my invention will be fully pointed out hereinafter, reference being had to the accompanying drawings, in which:

Figure 1 is an external elevation of my improved valve structure. Fig. 2 is a longitudinal, vertical section of the same. Fig. 3 is a horizontal section taken on the line 3—3 of Fig. 2. Fig. 4 is a view of the valve and its arm detached from the casing, the valve being shown in section.

In the drawings, 1 represents a suitable casing, made of metal and preferably cylindrical in cross section. This casing has oppositely-extending, threaded projections 2 and 3, with bores communicating with a chamber 4 within said casing, and serving respectively as inlet and outlet passageways for the flow of fluids, liquid or gaseous. The outlet passageway is provided with an internal valve seat 5, and a valve 6 of suitable construction is adapted to this seat.

The valve is carried by a bent arm 7 having a stem 8 receiving the valve, which is substantially horizontal when the valve is seated. Journaled in the casing is a shaft or spindle 9 having a squared portion 10 to which the squared collar 11 of the bent arm is adapted, and said shaft or spindle is provided with a reduced end 12 which enters a suitable socket 13 in a portion of the casing. The casing is provided with a stuffing-box 14 for the shaft or spindle, having a recess 15 for packing, which is held in place by a gland nut 16.

The valve is controlled by an external handle 17 suitably secured to the shaft or spindle, and such valve is so disposed as to close with the pressure. When raised from its seat, it may be turned so as to occupy a position in the top of the casing, as shown by dotted lines in Fig. 2, and thereby leave the through opening for the passage of the fluids entirely free.

As shown in the drawings, the through opening formed by the inlet and outlet passageways is centrally disposed with respect to the casing. It will be understood, of course, that such through opening might be disposed at one side of the casing and that the valve might be carried by a shaft or spindle disposed substantially at right angles to the position shown in the drawings. The arm carrying the valve is preferably bent as shown, since it permits the shaft 9 to be located near a position directly above the valve seat 5 to insure the positive seating of the valve with substantially perfect registry. The casing is preferably cup-shaped as indicated, with its top closed by a cap or cover 18.

Although I have shown a desirable embodiment of my invention, I do not wish to be limited to the precise construction and arrangement of parts, inasmuch as many different arrangements and modifications of the several parts may well come within the scope of my invention.

I claim:—

In a valve structure, the combination of a casing provided with a chamber, an inlet passageway, an outlet passageway and an internal tapering valve seat surrounding the outlet passageway; a shaft mounted to turn in said casing; an arm projecting fixedly from said shaft toward said inlet opening; a stem extending rigidly from said arm beneath said shaft and through said seat when the valve is closed, the free end of said stem being screw-threaded; a tapering valve head surrounding said stem and fitted to said seat; and a nut screwed on to said stem and clamping the valve head between the nut and said arm.

In testimony whereof I affix my signature in presence of two witnesses.

WINFIELD S. BELLOWS.

Witnesses:
JAMES W. HAINES,
K. POESYOU.

Copies of this patent may be obtained for five cents each, by addressing the "Commissioner of Patents, Washington, D. C."